(12) United States Patent
Pau et al.

(10) Patent No.: US 9,317,898 B2
(45) Date of Patent: Apr. 19, 2016

(54) METHOD AND APPARATUS FOR COMPUTING IMAGE PYRAMIDS AND RELATED COMPUTER PROGRAM PRODUCT

(71) Applicant: STMICROELECTRONICS S.r.l., Agrate Brianza (IT)

(72) Inventors: Danilo Pietro Pau, Sesto San Giovanni (IT); Arcangelo Ranieri Bruna, Giardini Naxos (IT); Ettore Napoli, Baronissi (IT); Giorgio Lopez, Naples (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 178 days.

(21) Appl. No.: 14/156,327

(22) Filed: Jan. 15, 2014

(65) Prior Publication Data

US 2014/0198995 A1 Jul. 17, 2014

(30) Foreign Application Priority Data

Jan. 15, 2013 (IT) .............................. TO2013A0032

(51) Int. Cl.
*G06K 9/36* (2006.01)
*G06T 3/40* (2006.01)
(Continued)

(52) U.S. Cl.
CPC ........ *G06T 3/4092* (2013.01); *G06F 17/30247* (2013.01); *G06K 9/527* (2013.01); *G06T 3/4084* (2013.01); *G06K 9/00986* (2013.01); *G06K 9/4671* (2013.01)

(58) Field of Classification Search
CPC ... H04N 19/176; H04N 19/30; H04N 19/147; H04N 19/59; H04N 19/61; H04N 19/172; H04N 19/18; H04N 19/184; H04N 19/19; H04N 19/70; H04N 19/124; H04N 19/126; H04N 19/132; H04N 19/428; H04N 19/144; H04N 19/513; H04N 19/117; H04N 19/119; H04N 19/13; H04N 19/137; H04N 19/139; H04N 19/159; H04N 19/16; H04N 19/162; H04N 19/17; H04N 19/40; H04N 19/427; H04N 19/82; H04N 19/90; H04N 19/91; H04N 19/136; H04N 19/122; H04N 19/531; H04N 19/547; H04N 19/573; H04N 19/60; H04N 19/625
USPC ......................................................... 382/280
See application file for complete search history.

(56) References Cited

U.S. PATENT DOCUMENTS 6,005,983 A 12/1999 Anderson et al.
6,711,293 B1 3/2004 Lowe
(Continued)

FOREIGN PATENT DOCUMENTS

EP 1110381 7/2003

OTHER PUBLICATIONS

Miroslaw Bober et al., "Test Model 3: Compact Descriptors for Visual Search", International Organisation for Standardisation, ISO/IEC JTC1/SC29/WG11/W12929; Coding of Moving Pictures and Audio, Video Subgroup; Jul. 2012, Stockholm, SE; 35 pages.
(Continued)

*Primary Examiner* — Ali Bayat
(74) *Attorney, Agent, or Firm* — Seed IP Law Group PLLC (57) ABSTRACT

An embodiment of a method for computing pyramids of input images (I) in a transformed domain, e.g., for search and retrieval purposes, includes:—arranging input images in blocks to produce input image blocks,—subjecting the input image blocks to block processing including: transform into a transformed domain, subjecting the image blocks transformed into a transformed domain to filtering, subjecting the image blocks transformed into a transformed domain and filtered to inverse transform implementing an inverse transform with respect to the previous transform into a transformed domain, thus producing a set of processed blocks. The set of processed blocks, which is recomposeable to an image pyramid, may be used, e.g., in detecting extrema points in images in the pyramid, extracting a patch of given size around the extrema points detected, and processing the patch to obtain local descriptors such as SIFT descriptors of a feature.

24 Claims, 6 Drawing Sheets

(51) Int. Cl.
*G06K 9/52* (2006.01)
*G06F 17/30* (2006.01)
*G06K 9/46* (2006.01)
*G06K 9/00* (2006.01)

(56) References Cited

U.S. PATENT DOCUMENTS

| | | | | |
|---|---|---|---|---|
| 8,648,858 B1* | 2/2014 | Swenson et al. | ............. | 345/428 |
| 2001/0055340 A1 | 12/2001 | Kim et al. | | |
| 2008/0292002 A1* | 11/2008 | Amon et al. | ............. | 375/240.24 |
| 2013/0038686 A1* | 2/2013 | Chen et al. | ............. | 348/43 |
| 2014/0219346 A1* | 8/2014 | Ugur et al. | ............. | 375/240.12 |

OTHER PUBLICATIONS

Miroslaw Bober et al., "Test Model 4: Compact Descriptors for Visual Search", International Organisation for Standardisation, ISO/IEC JTC1/SC29/WG11/W13145; Coding of Moving Pictures and Audio, Video Subgroup; Oct. 2012, Shanghai, CN; 42 pages.
Witkin, A. P.: "Scale-space filtering", Proc. 8th Int. Joint Conf. Art. Intell., 1983, Karlsruhe, Germany, pp. 1019-1022.
Cleve Moler, MathWorks and Steve Eddins, "Faster Finite Fourier Transforms MATLAB", available at: http://www.mathworks.it/company/newsletters/articles/faster-finite-fourier-transforms-matlab.html, published Jan. 2001; 4 pages.
Italian Search Report for Italian Application No. TO20130032, Ministero dello Sviluppo Economico, The Hague, Holland, Sep. 16, 2013, 5 pages.
Anil K. Jain: "Image Transforms", In: "Fundamentals of digital image processing", 1989, Prentice-Hall, New Jersey, USA, 57 pages.
Martucci S. A.: "Image 12-14 resizing in the discrete cosine transform domain", IEEE, Proceedings of the International Conference on Image Processing. (ICIP). Washington, Oct. 23-26, 1995; pp. 244-247.
Anonymous: "Description of Core Experiments on Compact Descriptors for Visual Search", MPEG Meeting;Oct. 15, 2012-Oct. 19, 2012; (Motion Picture Expert Group or ISO/IEC JTC1/SC29/WG11; Shanghai; China, Oct. 2012; 18 pages.
Danilo Pau et al: "CDVS Whitepaper: STM proposal", MPEG Meeting; Oct. 15, 2012-Oct. 19, 2012; Shanghai; (Motion Picture Expert Group or ISO/IEC JTC1/SC29/WG11); Shanghai, China, Oct. 2012, 43 pages.
David G Lowe: "Distinctive Image Features from Scale-Invariant Keypoints", International Journal of Computer Vision, Kluwer Academic Publishers, Boston, USA, vol. 60, No. 2, Nov. 2004, pp. 91-110.
Tsuban Chen: "The past, present, and future of image and multidimensional signal processing", IEEE Signal Processing Magazine, vol. 15, No. 2, Mar. 1998, pp. 21-58.
Andrew B Watson: "The Cortex Transform: Rapid Computation of Simulated Neural Images", Computer Vision, Graphics, and Image Processing, Elsevier Science, vol. 39, No. 3, Duluth, MN, Sep. 1987, pp. 311-327.
Danilo Pietro Pau, Arcangelo Ranieri Bruna, "Rilevazione Di Caratteristiche Di Un'Immagine", Italian Patent Application No. VI2012A00041; filed Nov. 9, 2012, Rome, Italy, 26 pages.
Web page: http://www.fftw.org/; Jan. 15, 2014, 3 pages.
Web page: http://en.wikipedia.org/wiki/Scale_model; Scale Model; Jan. 15, 2014; 19 pages.
Web page: http://en.wikipedia.org/wiki/Signal_(information_theory); Signal (electrical engineering); Jan. 15, 2014; 7 pages.
Web page: http://en.wikipedia.org/wiki/Knowledge_representation; Knowledge representation and reasoning; Jan. 15, 2014; 11 pages.
Web page: http://en.wikipedia.org/wiki/Smoothing; Smoothing; Jan. 15, 2014; 3 pages.
Web page: http://en.wikipedia.org/wiki/Downsampling; Downsampling; Jan. 15, 2014; 5 pages.
Web page: http://en.wikipedia.org/wiki/Scale_space; Scale space; Jan. 15, 2014; 13 pages.
Web page: http://en.wikipedia.org/wiki/Multiresolution_analysis; Multiresolution analysis; Jan. 15, 2014; 3 pages.

* cited by examiner

METHOD AND APPARATUS FOR COMPUTING IMAGE PYRAMIDS AND RELATED COMPUTER PROGRAM PRODUCT

PRIORITY CLAIM

The instant application claims priority to Italian Patent Application No. TO2013A000032, filed 15 Jan. 2013, which application is incorporated herein by reference in its entirety.

TECHNICAL FIELD

An embodiment relates to techniques of processing digital images to compute image pyramids.

Various embodiments may apply to the extraction of features from still images and video content, e.g., for the extraction of interest points in the scale space from video content, in view of possible use, e.g., for visual search and retrieval purposes.

SUMMARY

An image pyramid is a collection of images arising from a single original image that is successively downsampled until some desired point is reached.

Pyramid or 'pyramid representation' may thus be a type of multi-scale (http://en.wikipedia.org/wiki/Scale model) signal (http://en.wikipedia.org/wiki/signal (information theory)) representation (http://en.wikipedia.org/wiki/Knowledge representation) adopted in image processing, e.g., where an image is subject to repeated smoothing (http://en.wikipedia.org/wiki/Smoothing and subsampling (http://en.wikipedia.org/wiki/Downsampling) (the content pointed to by these hyperlinks is incorporated by reference). Historically, pyramid representation is a predecessor to scale-space representation (http://en.wikipedia.org/wiki/Scale space) and multi-resolution analysis (http://en.wikipedia.org/wiki/Multisolution analysis) (the content pointed to by these hyperlinks is incorporated by reference).

Out of various known types of image pyramids (e.g., Burt, FSD, Gaussian, or Laplacian), Gaussian pyramids may be used, e.g., to downsample images and Laplacian pyramids may be used, e.g., to reconstruct an upsampled image from an image lower in the pyramid (i.e., with lower resolution).

Extracting compact descriptors from still images and video signals for use, e.g., in visual search and retrieval applications is becoming more and more important in view of the increasing amount of digital video content produced and consumed every day and the need to search for objects, places, and people which are part of these contents.

Documents such as ISO/IEC JTC1/SC29/WG11/W12929, July 2012, Stockholm, Sweden, Test Model 3: Compact Descriptors For Visual Search, which is incorporated by reference, describe processing techniques (for example, with pipeline architecture) based upon the use of compact descriptors for functions such as matching and retrieval of images.

In particular Section 1. Introduction, Section 2. Compact Descriptor Extraction and Section 5. Software Architecture and Implementation Details of the document in question illustrate examplary embodiments of an architecture for the generation and selection of the most significant visual features to be compressed in each digital video frame considered.

Various architectures and technologies of components that are able to execute the functions of matching and retrieval illustrated therein are defined in the so-called Test Model 3.0 (TM3) for Compact Descriptors for Visual Search (CDVS), which is incorporated by reference: the TM3 model implements the functions for extraction, compression, and comparison of compact descriptors limited to a set of predetermined descriptor lengths. Interest points or keypoints in an image based upon a multiscale representation can be obtained, for example, with a Differences-of-Gaussians (DoG) technique and the feature points may be described, for example, with a Scale-Invariant Feature Transform (SIFT).

Possible criteria of implementation are provided in the article by D. G. Lowe: "Distinctive Image Features from Scale-Invariant Keypoints", International Journal of Computer Vision, vol. 60, no. 2, pp. 91-110, November 2004 and in U.S. Pat. No. 6,711,293 B1, which is incorporated by reference and which discloses a method and apparatus for identifying scale invariant features in an image and use of the same for locating an object in an image.

Further developments are provided in the paper by Miroslaw Bober et al. "Test Model 4: Compact Descriptors for Visual Search, Video Subgroup", October 2012, Shanghai, CN, ISO/IEC JTC1/SC29/WG11/W13145, which is incorporated by reference and which discloses a model of MPEG Compact Descriptors for Visual Search (CDVS), providing i.e., an extraction module which produces a compact descriptor composed of two main elements, namely a selected number of compressed local descriptors and a single global descriptor, representing the whole image.

Other documents of interest include the conference papers by Witkin, A. P.: "Scale-space filtering", Proc. 8th Int. Joint Conf. Art. Intell., Karlsruhe, Germany,1019-1022, 1983 as well as EP 1 110 381 B1, U.S. Pat. No. 6,005,983 B1 and Italian Patent Application VI2012A00041, which documents are incorporated by reference.

The model disclosed in the document by Miroslaw Bober et al. "Test Model 4: Compact Descriptors for Visual Search, Video Subgroup", October 2012, Shanghai, CN, ISO/IEC JTC1/SC29/WG11/W13145—already mentioned and incorporated by reference in the foregoing—demonstrates a potentially serious lack of efficiency when a still image and video are intended to be processed under the strict constraints of real time: for instance, the related processing scheme may not be well parallelizable from the view point of architectural and hardware/software implementation, e.g., as a pipelined scheme, and may lead to poorer performance in terms of mathematical precision and bit depth, these drawbacks becoming more and more serious as the number of pixels of the image (i.e., image resolution) increases.

One or more embodiments are designed to overcome one or more of the above-mentioned drawbacks.

Various embodiments may refer to corresponding apparatus such as, e.g., combination apparatus including a capture device for images (still and/or video contents) and adapted to implement a method on the images captured, as well as to a computer program product that can be loaded into the memory of at least one computer and includes parts of software code that are able to execute the steps of a method when the product is run on at least one computer.

As used herein, reference to such a computer program product is understood as being equivalent to reference to a computer-readable means containing instructions for controlling the processing system in order to coordinate implementation of a method according to an embodiment. Reference to "at least one computer" is intended to highlight the possibility of an embodiment being implemented in modular and/or distributed form.

Various embodiments may be based on the recognition that computer vision and image/video processing may involve identifying and processing certain features which may only exist at a determined scale in the frame considered so that determining and isolating the scales at which the frames are processed may play a significant role in various procedures.

Various embodiments may be based on the recognition that an image or frame (for the purposes herein, these two terms will be considered as synonymous) may be represented as a function f(x,y) where x,y are the spatial coordinates of each pixel: a scale space representation of the frame may be a 3-dimensional representation given by f(x,y,t) where x,y are the spatial coordinates and t is the scale at which the frame is analyzed, such a scale dimension, t, being adapted to be directly related to the dimension of the features that are considered in a frame.

Various embodiments may be based on the recognition that processing may involve a set of frames determined from the scale-space representation at given t scale values t∈{$t_1, \ldots, t_N$}, so that when the scale dimension, t, increases, the objects identified in the frame also increase in size, whereby the resolution of the original frame may be reduced by subsampling without loss of information: such a set of frames derived from the scale-space representation at given t values and properly subsampled may be defined as a pyramid of the given frame.

Various embodiments may thus provide an apparatus implementing a method to determine an arbitrary pyramid of an image.

Various embodiments may involve processing in a transformed space and independently of the size of the input image.

Various embodiments may be based on the recognition that in an individual visual shot transformed in a spatial frequency domain, different filters can be applied in order to produce different responses, thus facilitating subsequent processing for interest-point detection and description computation.

BRIEF DESCRIPTION OF THE DRAWINGS

Various embodiments will now be described, purely by way of non-limiting example, with reference to the annexed figures, wherein.

DETAILED DESCRIPTION

In the ensuing description, various specific details are illustrated, aimed at providing an in-depth understanding of various exemplary embodiments. The embodiments may be obtained without one or more of the specific details, or with other methods, components, materials, etc. In other cases, known structures, materials, or operations are not illustrated or described in detail so that the various aspects of the embodiments will not be obscured.

Reference to "an embodiment" or "one embodiment" within the framework of the present description is intended to indicate that a particular configuration, structure, or characteristic described in relation to the embodiment is included in at least one embodiment. Hence, phrases such as "in an embodiment" or "in one embodiment" that may be present in various points of the present description do not necessarily refer to one and the same embodiment: consequently, details disclosed herein in connection with a function of a particular exemplary embodiment will be understood to be directly applicable to perform the same function also in the other exemplary embodiments disclosed. Moreover, particular conformations, structures, or characteristics may be combined in any adequate way in one or more embodiments.

The references used herein are provided merely for the convenience of the reader and hence do not define the extent of protection or the scope of the embodiments.

Figure 1:
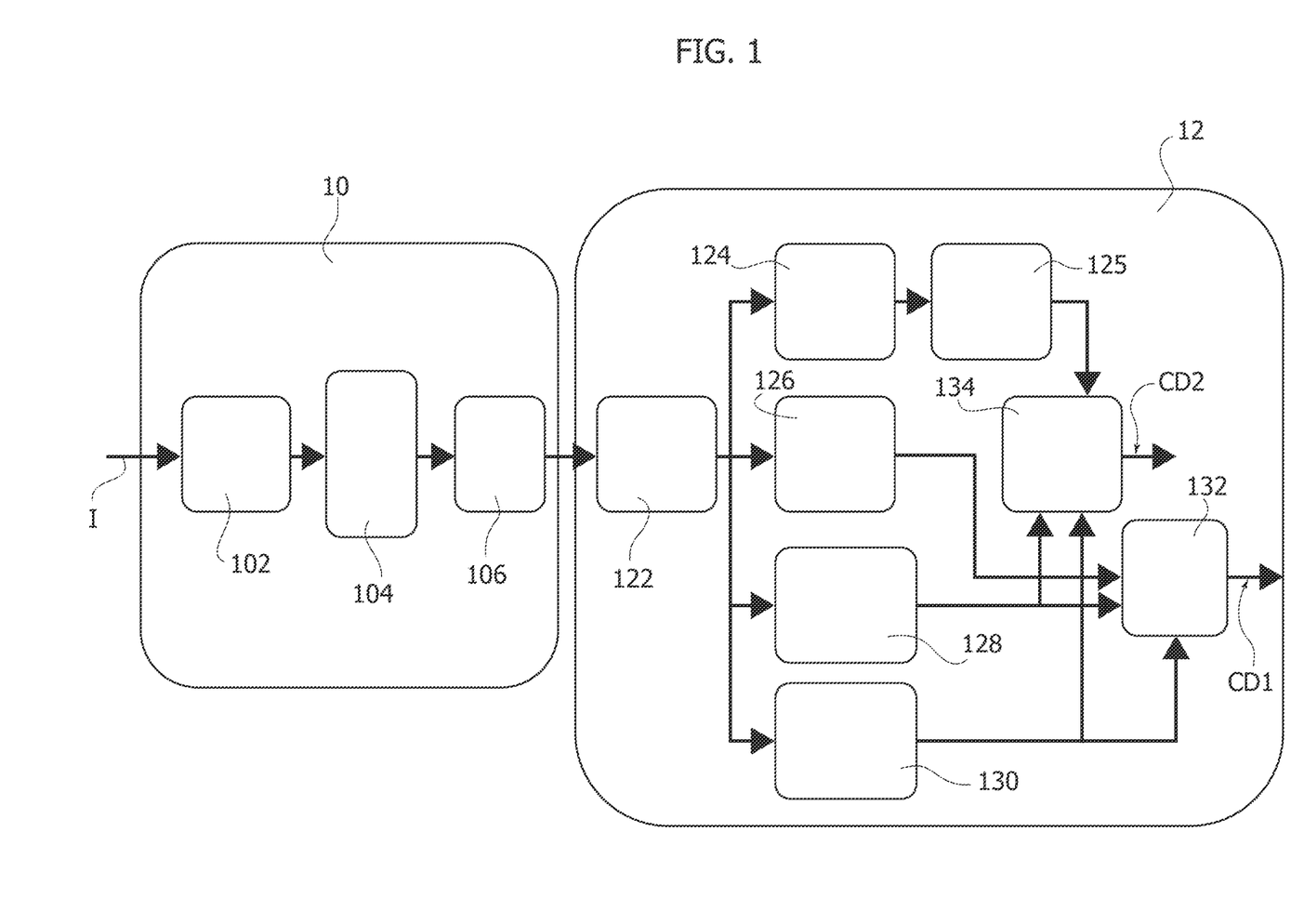
FIG. 1 is a block diagram of an exemplary descriptor extraction and encoding arrangement, according to an embodiment.

FIG. 1 is a block diagram of an exemplary cascaded arrangement of a local description extractor 10 and an encoder 12, according to an embodiment. In various embodiments, the arrangement 10, 12 may be adapted to process a digital input image (which may be either still or included as a frame in a flow of video content) and derive therefrom compact descriptors CD1, CD2. In various embodiments, these descriptors may be so-called S Mode (CD1) and H Mode (CD2) descriptors.

In an exemplary embodiment, the local description extractor 10 may include, cascaded to a resizing module 102, a detector of points of interest 104 and a module 106 adapted to extract local descriptors from the output of the interest-point detector 104.

The local descriptors from the extractor 10 are fed to a keypoint-selection module 122 acting as the input stage for the encoder 12. The output from the selection module 112 is forwarded to various encloders—e.g., a Transform followed by Scalar Quantization (SQ) encoding module 124 having cascaded an arithmetic encoding module 125, a Multi-Stage Vector Quantization (MSVQ) module 126, a coordinate coding module 128—and aggregated into a compact discriminative global descriptor e.g., a Scalable Compressed Fisher Vector (SCFV). S Mode and H Mode tools 132 and 134 generate the descriptors CD1 and CD2 starting from the outputs of modules 126, 128, 130 and 125, 128, 130, respectively.

Further details concerning the foregoing may be derived from the paper by Miroslaw Bober et al. "Test Model 4: Compact Descriptors for Visual Search, Video Subgroup", October 2012, Shanghai, CN, ISO/IEC JTC1/SC29/WG11/W13145, already mentioned and incorporated by reference in the foregoing; therefore, a further description of the foregoing components is omitted for brevity.

Various embodiments may relate to an apparatus that processes a digital image of generic resolution for computing a pyramid of the image. Such a pyramid may be useful as input for computer-vision procedures that work in the scale space. For immediate reference and by way of example, a pyramid as produced in various embodiments herein may be used in a Scale Invariant Feature Extraction (SIFT) procedure, e.g., within the framework of the paper by Miroslaw Bober et al. "Test Model 4: Compact Descriptors for Visual Search, Video Subgroup", October 2012, Shanghai, CN, ISO/IEC JTC1/SC29/WG11/W13145 already repeatedly referred to and incorporated by reference in the foregoing.

Figures 2, 3, 6A, 6B:
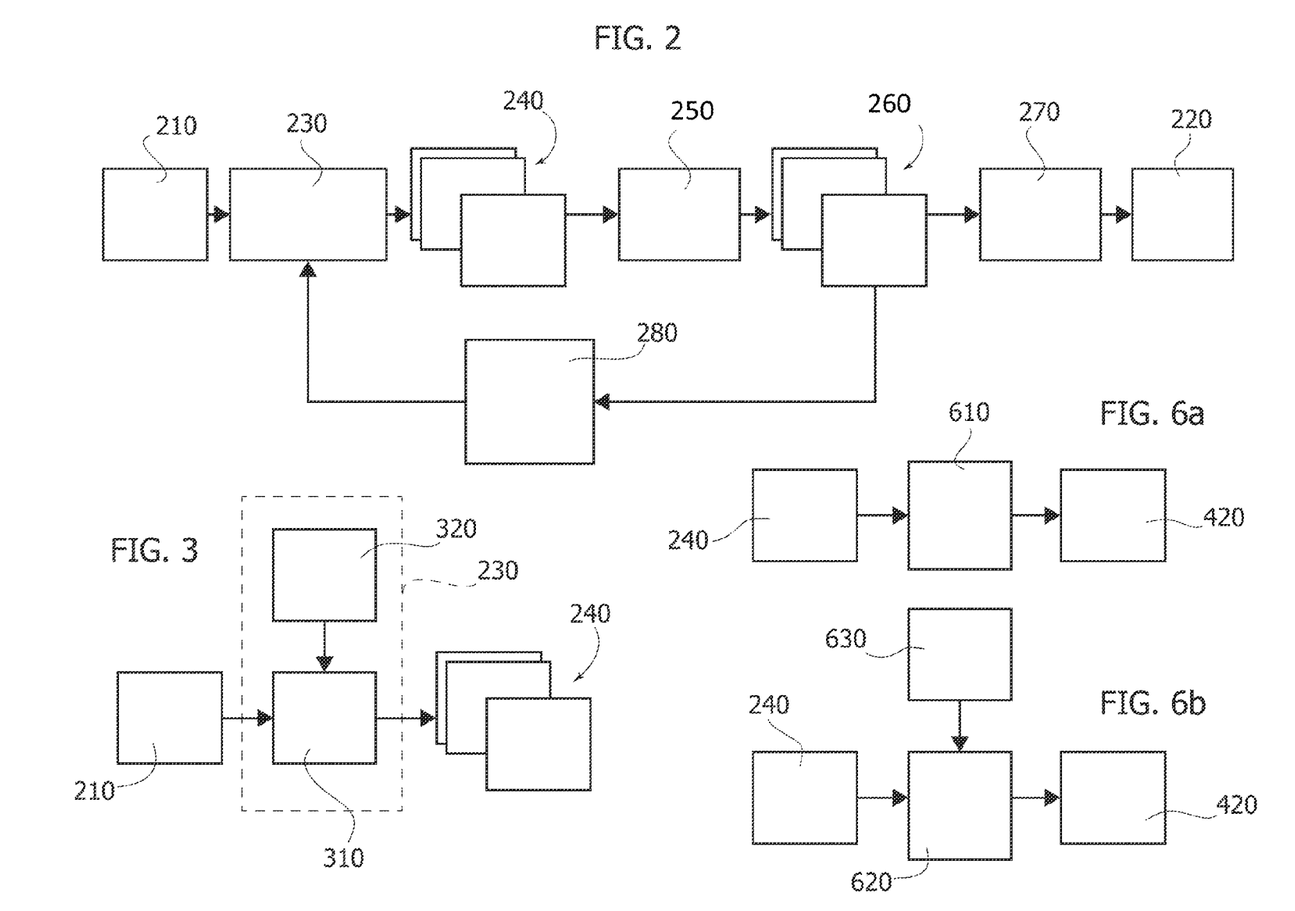
FIG. 2 is a block diagram of an exemplary pyramid processor, according to an embodiment.
FIG. 3 is a block diagram of an exemplary image decomposing module, according to an embodiment.
FIG. 6a is a block diagram of an exemplary transform module implemented with a 2D block processor, according to an embodiment.
FIG. 6b is a block diagram of an exemplary transform module implemented with a 1D block processor and a buffer, according to an embodiment.

FIG. 2 is a block diagram of an exemplary pyramid processor apparatus fed with a digital input image 210 to produce a set of images that are recomposeable into a respective image pyramid 220. Reference number 230 indicates an image-decomposing module that takes care of subdividing the input image 210 into possibly overlapping blocks of given size.

In the exemplary embodiment considered, each block in a set of image blocks, indicated by 240, may be fed to a block processor 250 for producing processed blocks 260, which may be recomposed in a recomposing module 270 to obtain the pyramid 220.

In the exemplary embodiment considered, a next-octave module 280 may also take care of providing to the decomposing module 230 a subsampled version of one of the processed blocks 260, which may permit the processing of the following octaves (filtered and subsampled images derived from the input image) of the input image.

An exemplary embodiment of the image-decomposing module 230 of FIG. 2 is detailed in FIG. 3.

In various embodiments, an input image 210 may be stored (not necessarily in a single step) in a buffer set 310 so that a control module called "block fetcher" 320 may pick up iteratively the proper pixels from the buffer set 310 and output them into the blocks 240.

Figure 4:
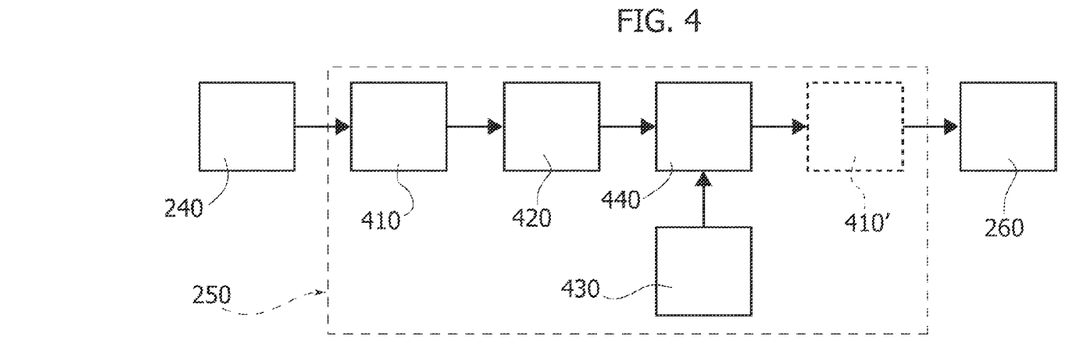
FIG. 4 is a block diagram of an exemplary block processor, according to an embodiment.

An exemplary embodiment of the block processor 250 of FIG. 2 is detailed in FIG. 4.

In various embodiments, the input data thereto may be a block of the image 240 produced by the image decomposing module 230 of FIG. 2 and the block processor may include a transform module 410, a block buffer 420 fed by the transform module 410, a filter-generation module 430, and a filtering module 440, with the filter-generation module 430 feeding the filtering module 440 with filter coefficients to filter the blocks from the block buffer 420.

In various embodiments, the functionality of the block processor 250 may be as follows.

An input block of the image 240 is transformed in the module 410, the transform operation being one which allows representing the input block in a domain (possibly different from the spatial domain) where the application of the desired or required filtering operation is more convenient. The transformed block is then stored in the buffer 420, and the transformed block stored in the buffer 420 may then be filtered using a filter 440 as configured by the filter-generation module 430.

In various embodiments, the filtered block resulting therefrom, which is still represented in the transformed space, may be further processed by a transform module 410' to be inverse transformed to the original domain of the input block, this operation producing one of the processed blocks indicated as 260 in FIG. 2. In various embodiments, the transform module 410' may be another instance or the same module 410 used at the beginning of the process (which is indicated by the representation in dashed lines).

Figure 5:
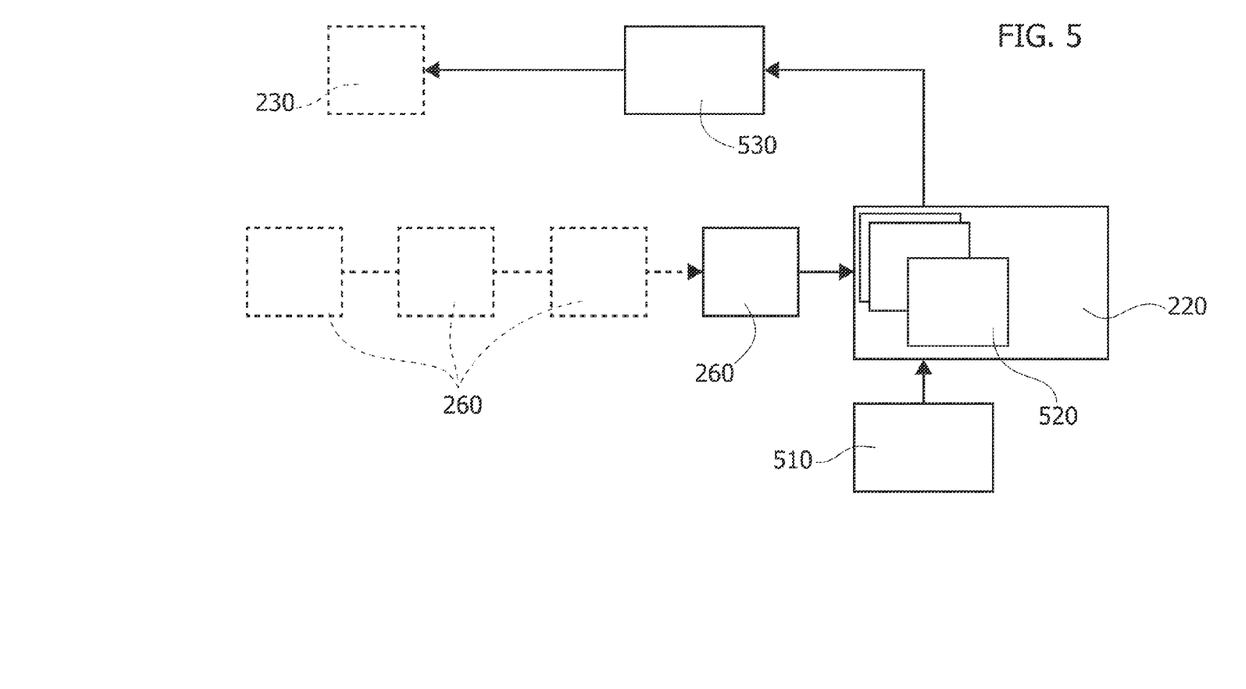
FIG. 5 is a block diagram of an exemplary image re-composing module, according to an embodiment.

In various embodiments, the process of filtering through the filtering module 440 the transformed block buffered at 420 may be repeated for one or more other filters contained in the filter-generation module 430, thus producing the whole set of filtered blocks indicated as 260 in FIGS. 2 and 5.

An exemplary embodiment of the image-recomposing module 270 of FIG. 2 is detailed in FIG. 5.

In various embodiments, a set of block accumulation memories 520 may be provided to store incrementally the various filtered blocks 260 from the filtering module 440 of FIG. 4 with the aid of an image-recomposing control module 510, which controls the memory operations and resolves the overlap between blocks where required. At the end of the cycle, the memories will hold (but, again, not necessarily all at the same time) the image pyramid 220 recomposed from the blocks 260.

Various embodiments of the recomposing module 270 may be functional in:

recomposing the possibly overlapping filtered blocks of the image 260 and hence generating the output pyramid 220, selecting one of the filtered images which, after a subsampling operation at 530 is fed to the image-decomposing module 230 for further processing so that the next octave of the input image may be generated.

Various embodiments of the transform module 410 may have a structure depending on the block-transform operation being implemented.

In various embodiments this may be implemented as shown in FIG. 6a, with a 2D (two-dimensional) block processor 610 that directly processes the input block, or as shown in FIG. 6b, with a 1D (one-dimensional) block processor 620 (and a temporary buffer memory, 630) that processes the input block twice, effectively once for each dimension. During a first processing phase or step, the 1D block processor 620 may process the block column-wise (or row-wise) with the result stored in the buffer memory 630. During a second processing phase or step, the 1D block processor 620 may process the block row-wise (or column-wise) with the result brought to the output of the transformer module.

Figure 7:
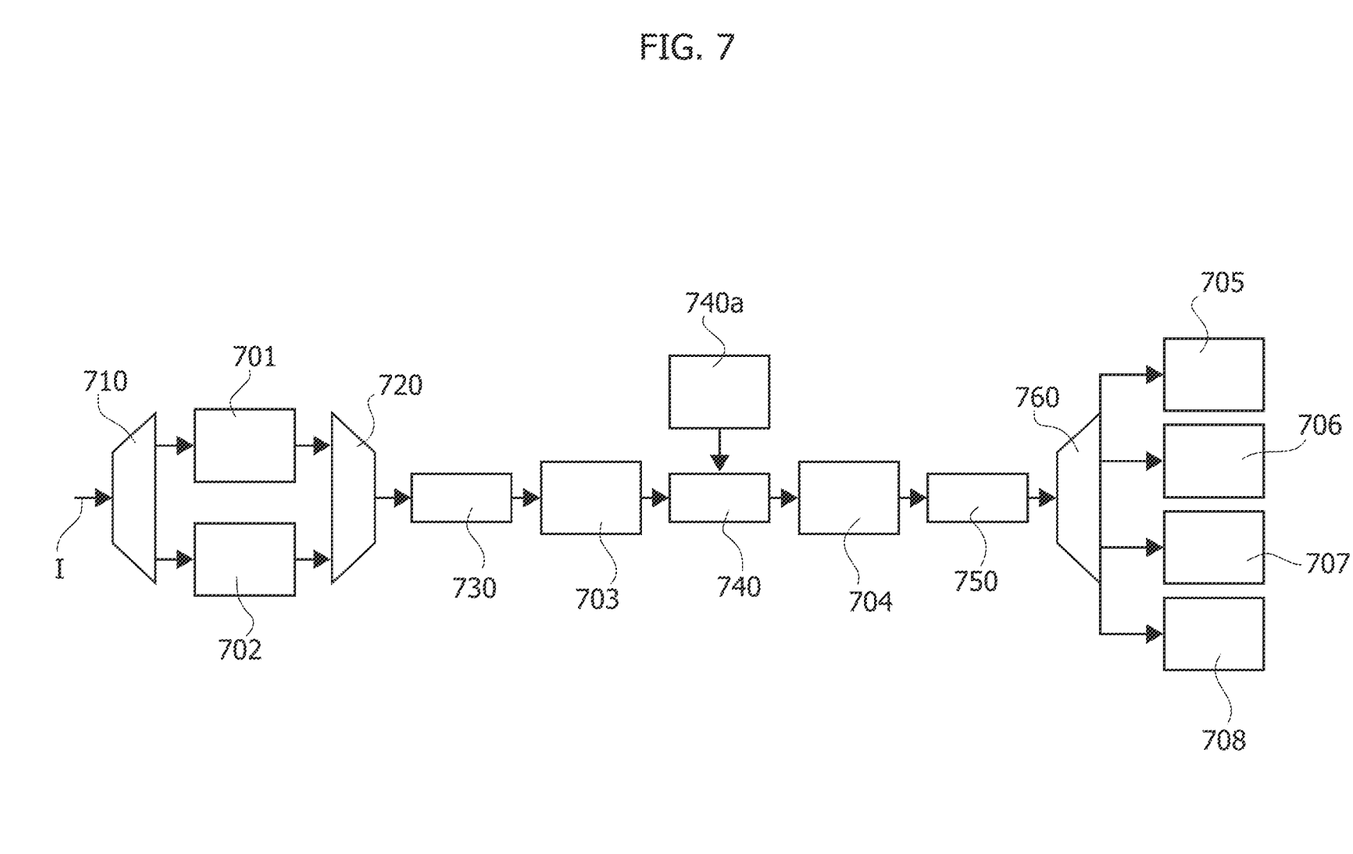
FIG. 7 is a block diagram of an exemplary block-based architecture without feedback loop, according to an embodiment.

FIG. 7 is representative of a generalized implementation of a block-based processing according to various embodiments.

In operation of the exemplary embodiment illustrated, an image (or "video" frame) I may be acquired, e.g., from an image sensor—e.g., an image-capture device such as a (video) camera, which is not shown in the figures. Acquisition may be, e.g., line-by-line or column-by-column via an input (de)multiplexer 710 in view of storing in a first buffer 701 (BUFFER 1) of, e.g., a limited size. When the first buffer 701 is full, subsequent lines may be stored in a second buffer 702 (BUFFER 2) in order to avoid loss of information, which may be assumed to be arriving in real time from the sensor.

In various embodiments, before the buffer 702 is full, the information in the buffer 701 may be completely processed in order to be overwritten by the time that the buffer 702 is full.

By way of non-limiting example, in the case of an input image of 640 pixel width and 480 pixel height, at 30 frames per second the buffer 701 may be capable of storing 128 lines (with buffers 701 and 702 capable of storing, e.g., 640×128=80 K Bytes) and thus will be filled in 8.9 ms, this representing the time for the information in either of these buffers to be processed by subsequent blocks in order to avoid loss of information.

In various embodiments, a multiplexer 720 may re-direct the output from the buffers 701 and 702 to the subsequent processing for producing results in a fixed amount of time.

In various embodiments, the buffers 701, 702 may be read in a block-based manner, i.e., based on blocks of, e.g., a square or rectangular shape of the contents of the buffers. The blocks may then be sent to a transform module 730 with respective output stored in a third buffer 703 (BUFFER 3).

In various embodiments, the transform module may implement, e.g.:

separable or non-separable Fast Fourier Transform (FFT),
separable or non-separable Discrete Cosine Transform (DCT),
separable or non-separable block-based wavelet transform,
any other type of spatial-frequency-signal-decomposition-based transform (e.g., Karhunen Loeve or similar).

In various embodiments, the third buffer 703 may be read by a filtering module 740, e.g., at a spatial frequency adapted to be dictated by the third buffer 703.

In various embodiments, the filtering module 740 may have one or more of the following features:

the module 740 may be implemented as a set of filters, e.g., parallel multiply-accumulate sub-modules,
the filters in the set are (each) composed by a single filter,
the filters apply filter coefficients stored in a filter memory 740a, e.g., a ROM or RAM memory,
the filters are not stored in a memory but generated with arithmetic operations,
the filters are partially stored in a memory and completed using arithmetic operations,
the filters are stored in one or more coarse memories and refined using one or more fine memories and arithmetic operations,
the filters are derived from an external input,
the filter set is variable during processing of an image or between subsequently processed images;
the filter set is variable during processing of each single block.

In various embodiments, the results of filtering at 740 may be stored in a fourth buffer 704 (BUFFER 4) in order to feed an inverse-transform module 750 to implement an inverse-processing function with respect to the transform module 730. In various embodiments, the transform module 750 may be another instance or the same module 730 used at the beginning of the process.

In various embodiments, the results from the transform module 750 may be demultiplexed at 760 to a set of buffers, e.g., 705 (BUFFER 5), 706 (BUFFER 6), 707 (BUFFER 7), 708 (BUFFER 8) to complete the interest-point detection in terms of extrema detection and removal of low responses and unstable extrema interest points.

Various embodiments as exemplified in the foregoing may be applied to the extraction of features from images/frames both as still images and as video contents. As indicated, an image pyramid may be useful in various procedures, such as those that are being standardized in the CDVS (Compact Descriptors for Visual Search) committee (WG11.SC29 committee).

By way of background to possible application of various embodiments, a scheme proposed by the CDVS committee may be as exemplified in FIG. 1, with the local description extractor 10 of FIG. 1 adapted to be based either on the SIFT algorithm (as detailed, e.g., in U.S. Pat. No. 6,711,293 B1, which is incorported by reference) or on the similar algorithm described in Miroslaw Bober et al. "Test Model 4: Compact Descriptors for Visual Search, Video Subgroup", October 2012, Shanghai, CN, ISO/IEC JTC1/SC29/WG11/W13145, which is incorporated by reference.

In both cases feature extraction may involve:

generating an image pyramid (which may occur in a transformed space and with a block-based approach as described in the foregoing);
detecting the extrema points in some of the images in the pyramid;
extracting a patch of given size around the extrema points;
processing the patch to obtain the local descriptor of the feature.

Various embodiments may thus provide a digital processor (possibly software(SW)-based) for processing an input image in a transformed space and with a block-based approach, able to extract the local descriptors of the features belonging to the images, without explicitly calculating (i.e., recomposing) a full image pyramid, which may result in a significant reduction of the amount of memory needed for the implementation of the processor.

Figure 8:
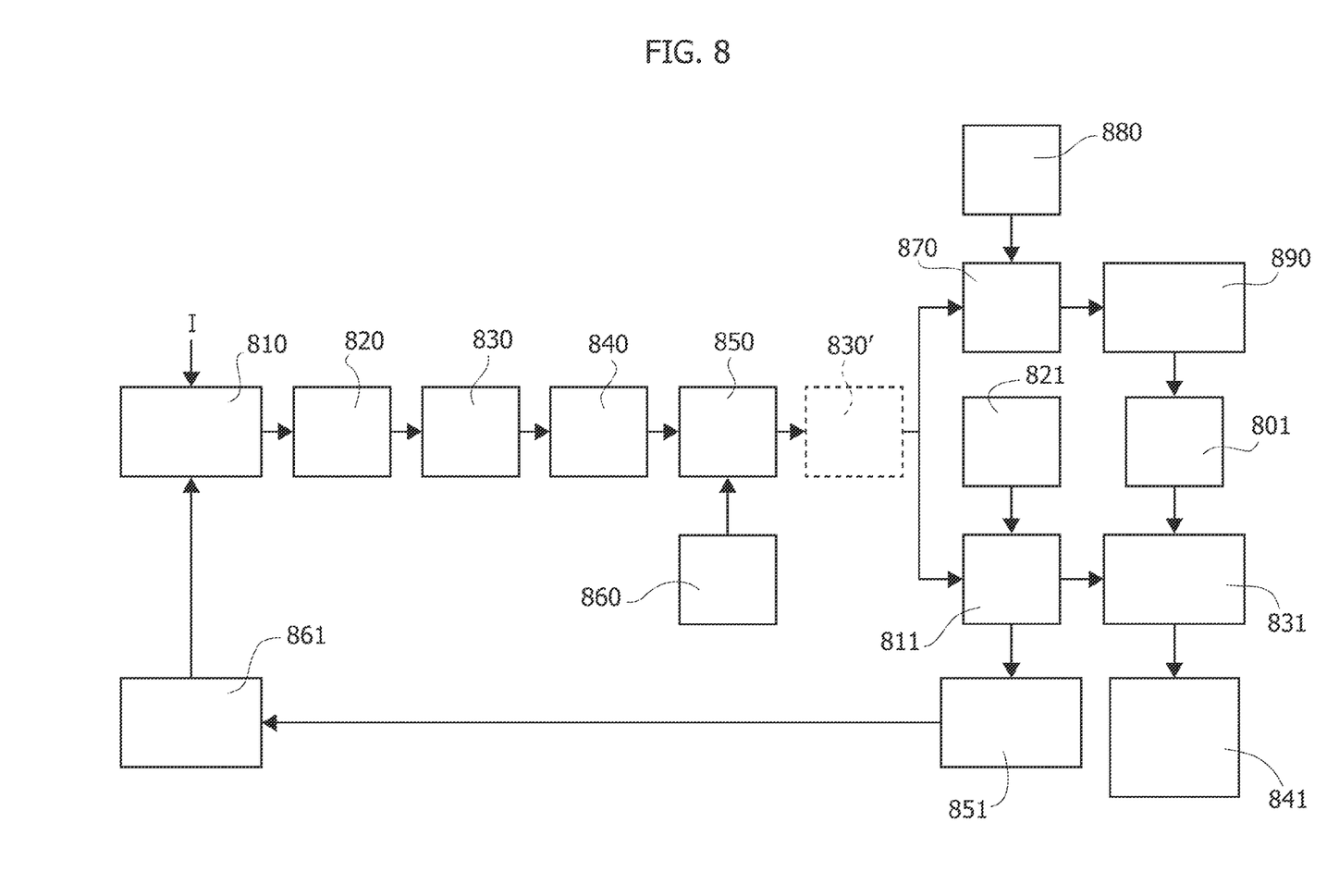
FIG. 8 is a block diagram of an exemplary processor for the extraction of local descriptors from an image, according to an embodiment.

FIG. 8 is a diagram schematically representative of embodiments incorporating a digital processor as exemplified previously for extracting local descriptors from an image, i.e., for receiving an image/frame as an input and producing local descriptors of image features as an output.

In various embodiments, image processing may be block-based so that in no part of the processor the whole images of the pyramid are memorized.

Various embodiments may be based on the recognition that at least one, and optionally both, of the following may apply:

in order to calculate the extrema for a generic processed block, only the pyramid of the block being processed and a small amount of overlap buffers containing pixels obtained from previously processed blocks may be required, and/or
in order to extract the patch relevant for the generation of a local descriptor of a particular feature, only the pyramid of the block being processed and a small set of buffers containing pixels from previously processed blocks may be required.

In the exemplary diagram of FIG. 8, an input buffer 810 may contain a whole image or a subset of an image (by way of non-limiting example, a subset of its lines or columns).

A block selector 820 may select a given size block from the buffer 820 and send it to a transform module 830 in order to store in a block buffer 840 an alternate-domain version of the same for filtering.

A filtering module 850 may then apply iteratively one of a set of filters provided at 860 by producing (after an inverse transform 830', again adapted to be performed by the same module in 830 or another instance of the same—as highlighted by the representation in dashed lines) either a LoG block or a Scale block, e.g., according to the formulation of the SIFT algorithm. The disclosure provided in the foregoing in respect of the filter module 740 of FIG. 7 may also apply to the filtering module 850.

In the LoG case, the block may be memorized in one of a set of LoG block buffers 870: a peak finder 890 (possibly concurrently with other operations involving other buffers or the transform module) may then identify keypoint candidates in the current block and store them in a queue 801.

Since various embodiments may operate on an image by blocks, some means may be provided in order to produce an overlap between adjacent blocks in order to avoid loss of cross-block keypoints; this may be obtained, e.g., by means of a set of overlap buffers 880.

In the Scales case, a block may be memorized in one of a set of Scales block buffers 811. Also in this case a set of overlap buffers 821 may be provided, with the proviso that these may have different characteristics (e.g., size) with respect to the buffers at 880.

In various embodiments, a patch extractor 831, acting on the basis of the information in the KPs queue 801, may extract the patches from the proper scales in the buffer 811 and send them to a descriptors builder 841 which elaborates the SIFT descriptors for the keypoint (KP) considered.

In various embodiments, in order to build the next octave, a downsampler 851 may operate on one of the blocks in the scales buffer, by accumulating its outputs in a dedicated buffer 861.

Figure 9:
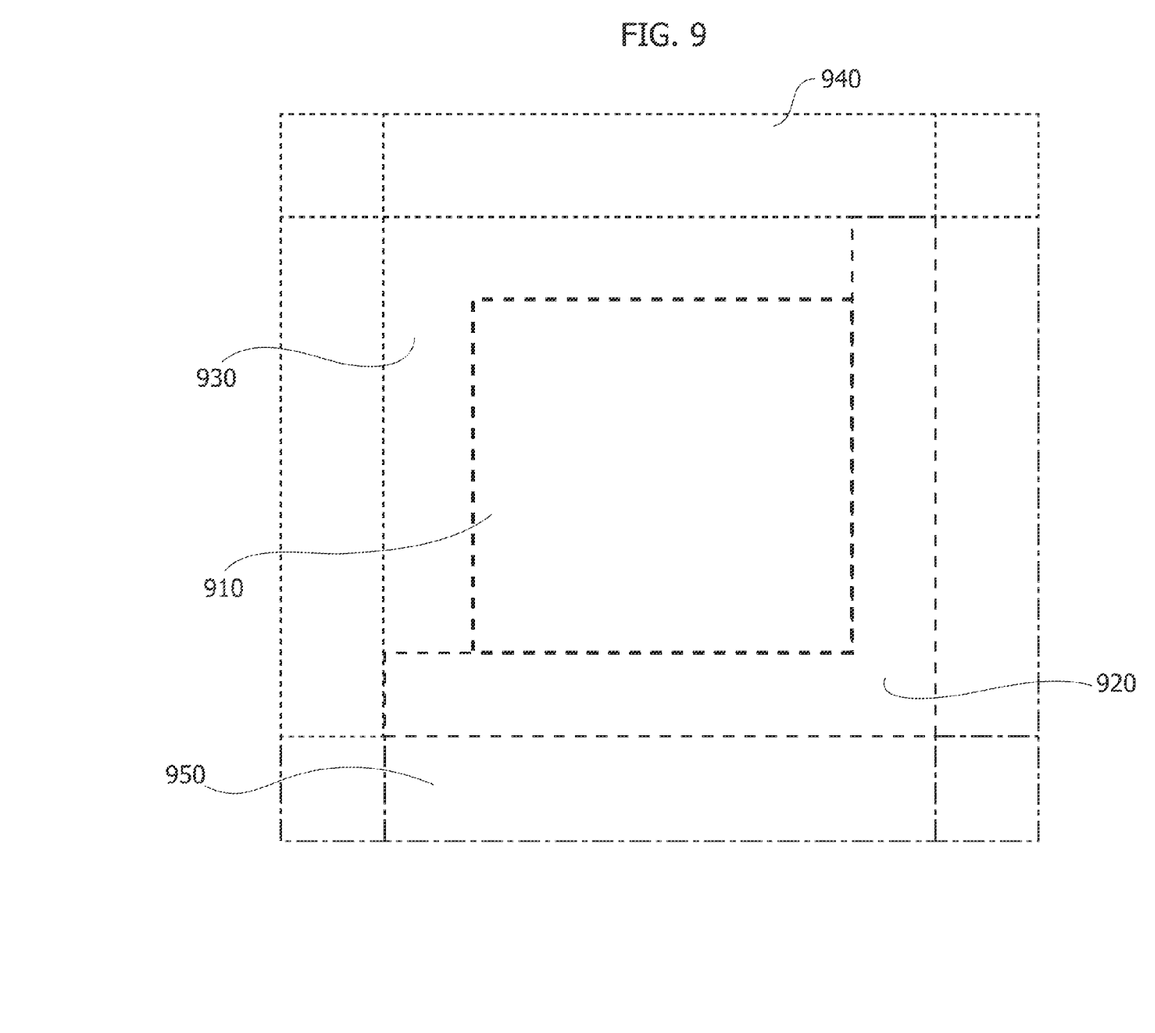
FIG. 9 is an exemplary representation of block processing, according to an embodiment.

FIG. 9 is an exemplary detailed view of blocks which explains the role possibly played of overlap buffers.

By way of example, it may be assumed that, within the framework of a whole area as shown in FIG. 9, a certain space may be needed to perform either a patch extraction or a peak detection. This leads to a center area 910 within the block being available for processing, e.g., by using (only) pixels from the current block. Another area 930 may also be available for processing involving some pixels from "old" blocks, indicated by 940, to be kept in a set of auxiliary buffers. Another area, which may be called a delayed processing area 920, may not be available for processing instead, because it involves pixels from "next" blocks, indicated 950, to be ready. This area may be stored in auxiliary buffers for use when these next blocks are processed.

Details of an Exemplary Software and Hardware Implementations

Various embodiments may be used in an interest-point detector produced by altering, e.g., in a VIFeat library, the filtering and pyramid generation stage in the DoG detector. The Fourier Based algorithms affect only the SIFT interest-point detection, and thus code changes are limited to the VIFeat library and the VISiftWrapper class in a Test Model. The Fast Fourier Transform (FFT) is applied multiple times during the execution of the procedure, and may involve an optimized implementation in the fftw library (http://www.fftw.org), which is incorporated by reference, as used, e.g., in various types of numerical software, most notably MATLAB (see, e.g., http://www.mathworks.it/company/newsletters/articles/faster-finite-fourier-transforms-matlab.html, including recent API functions such as e.g. fftw 3.3.3 or newer, which are incorporated by reference).

In various embodiments, the filters may be pre-computed and saved in text files loaded during the initialization of VIFeat's SIFT filters: the band-pass version may be in bpfilters.txt and the low-pass version in lpfilters.txt, which may be located in the working directory of the executables.

The VIFeat MATLAB Toolbox as used, e.g., for the retraining of the Test Model parameters, can also be compiled if the additional dependence is added to the corresponding makefiles. For instance a fftw3 flag may be appended to:
MEX_LDFLAGS in make/Matlab.mak
BIN_LDFLAGS in make/bin.mak
an embodiment of this method being applicable in general when library dependences are added to VIFeat.

Any changes to VIFeat may affect the following part of the library:
Filter initialization and deallocation: vl_sift_new, vl_sift_delete
Octave computation: vl_sift_process_first_octave, vl_sift_process_next_octave
Interest points detection: vl_sift_detect
In various embodiments:
the filter-initialization code may load from the text files the filter-banks coefficients, represented in the space domain, and generate the corresponding frequency responses tailored to the chosen block size. The code is called once for each image;
the octave computation code may first apply a smoothing to the image using a Gaussian filter computed on the fly (by the function unina_calc_gauss_filter), and then for each scale may apply the Frequency Based algorithm with a low-pass filter bank with increasing variance, specified in lpfilters.txt (e.g., Gaussian with an appropriate variance).

For simplicity of implementation, filtering may be computed by transforming via FFT the image each time, and thus the total number of transforms per octave is two times the number of scales.

Any changes in the interest-point-detection part may involve changes in the computation of the DoG image pyramid. In the original VIFeat algorithm the, response is computed using the difference between adjacent scales; the result may now be obtained using Frequency Based Scales Computation with a bank of band-pass filters (a DoG kernel, in an exemplary case as considered) with increasing scales, and the input image for the filters is the image corresponding to the smaller scale in the current octave.

A related processor may include an iteratively used datapath of which the central part is a 1D mixed radix FFT module that operates on 128-samples-long sequences. A monodimensional FFT module may be used twice, with the first cycle inputs being provided in a streaming fashion and the intermediate products stored in a first block buffer (Block Buffer 1). After a second FFT cycle, Block Buffer 1 will be storing the frequency spectrum of the block considered. After this phase, the actual filtering may be performed by means of multiplying ROM-stored filter coefficients by the contents of the Block Buffer 1. Results of this elaboration may then be stored in a second block buffer (Block Buffer 2) since the inverse FFT transform may also be performed in two steps, with output provided as a stream during the second inverse FFT cycle.

Such an architecture may be implemented, e.g., in a Xilinx Virtex 5 VLX 110 FPGA with a maximum clock frequency of 100 MHz: since the complete elaboration of a single block takes approximately 82K clock cycles and a VGA frame decomposes in the DoG pyramid into 59 128-by-128 blocks, the time needed to perform the complete elaboration of a single frame is 48 ms in an embodiment.

This leads to a maximum frame rate of circa 21 fps, making various embodiments suitable for real-time video processing.

Experimental Results for CDVS Test Model 4

Tests show that for higher rates (4 k and above) the average false alarm rate is improved when using Frequency Based Scales Computation as exemplified herein and in some cases the success rate is also improved with respect to Test Model 4.0. The differences may be less evident in the retrieval case, and in the S-mode a noticeable difference may be traced for the lower reference rates. Performance of Frequency Based Scales Computation may be slightly worse than Test Model 4.0, with a decrease of success rate of approximately 0.5% (both modes) in pairwise matching and a decrease of 0.9% (S-mode) and 0.88% (H-mode) in mAP in retrieval.

Various embodiments as exemplified in the foregoing may thus implement a method to compute an arbitrary image pyramid from an image.

Various embodiments may involve processing in a transformed space and the independence from the image resolution of the input frame. Various embodiments may be coupled with a procedure that finds peaks in a pyramid and may be used to build interest-point detectors alternative to the popular DoG detector currently adopted into Test Model 4.

Various embodiments may involve Frequency Based Scales Computation (FBSC) taking an image as an input and producing a filtered-image pyramid as a result.

In various embodiments the procedure may be block-based: an image decomposing/recomposing layer takes care of subdividing the input image in blocks of a given size, and each block is sent to a block-processing procedure that produces the processed blocks. The results may then be recomposed to obtain the pyramid.

In various embodiments, block processing may include a transform unit or module, a block buffer, a bank of filters, and multipliers banks, the function of block processing being to apply the filter banks to each block.

In various embodiments, an input block of the image may be initially transformed and stored in a buffer and then multiplied in the transformed space using a filter of a bank of filters. The resulting filtered block may then be converted back to the original domain using the inverse transform, this last operation producing one of the processed blocks.

In various embodiments, the steps of multiplying the transformed block and subsequent operations may be repeated for the other filters in the filter bank to produce the whole set of filtered blocks.

Various embodiments may be quite general and thus applicable to procedures involving an image pyramid generation step.

Various embodiments as exemplified herein may include processors (e.g., dedicated coprocessors) for frequency-domain filtering of block-partitioned frames (e.g., from a single image or a video stream) realized with a scale-space-oriented approach.

Block partitioning of frames performed prior to the Fast Fourier Transform may reduce the amount of operations needed to perform the filtering operations while providing flexibility regarding the image/frame size.

Without prejudice to the principles described herein, the details of construction and the embodiments may vary, even significantly, with respect to what is illustrated herein purely by way of non-limiting example, without prejudice to the extent of protection.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
  a transform circuit configured,
    to receive input blocks of an image, each input block representing a portion of the image in a first domain and at a first resolution, and
    to generate in response to each input block a respective transformed block representing the corresponding portion of the image in a second domain;
  a filter configured to generate in response to each transformed block a respective filtered block;
  an inverse-transform circuit configured to transform each filtered block into a respective inverse-transformed block representing the corresponding portion of the image in the first domain; and
  a resolution converter circuit configured,
    to convert at least one of the inverse-transformed blocks into a respective converted block representing the corresponding portion of the image at a second resolution, and
    to provide each converted block to the transformer.

2. The apparatus of claim 1 wherein the filter is configured to generate in response to each transformed block and filter functions respective filtered blocks.

3. The apparatus of claim 1 wherein the transform circuit is configured to generate the respective transformed block according to a Fourier Transform.

4. The apparatus of claim 1 wherein the transform circuit is configured to generate the respective transformed block according to a Discrete Cosine Transform.

5. The apparatus of claim 1 wherein the transform circuit is configured to generate the respective transformed block according to a Wavelet Transform.

6. The apparatus of claim 1 wherein the transform circuit is configured to generate the respective transformed block according to a spatial-frequency-signal-decomposition-based transform.

7. The apparatus of claim 1 wherein:
  the resolution converter circuit includes a down sampler circuit; and
  the second resolution is lower than the first resolution.

8. The apparatus of claim 1, further comprising a block provider circuit configured to provide the input blocks of the image to the transform circuit.

9. The apparatus of claim 1, further comprising a block generator circuit coupled to the resolution converter circuit and configured:
  to generate a respective one of the input blocks in response to each of the converted blocks; and
  to provide the input blocks to the transform circuit.

10. The apparatus of claim 1, further comprising a block generator circuit coupled to the resolution converter circuit and configured:
  to generate initial ones of the input blocks in response to respective portions of the image;
  to generate a respective subsequent one of the input blocks in response to each of the converted blocks; and
  to provide the initial and subsequent input blocks to the transform circuit.

11. The apparatus of claim 1, further comprising:
  a keypoint identifier circuit configured to identify a keypoint of the image in response to at least one of the inverse-transformed blocks; and
  a descriptor generator circuit configured to generate in response to the identified keypoint a descriptor corresponding to the keypoint.

12. The apparatus of claim 1 wherein at least two of the input blocks represent overlapping portions of the image.

13. The apparatus of claim 1 wherein at least two of the inverse-transformed blocks represent overlapping portions of the image.

14. A system, comprising:
  an image-capture device configured to capture an image;
  a transformer configured
    to receive from the image-capture device input blocks of the image, each input block representing a portion of the image in a first domain and at a first resolution, and
    to generate in response to each input block a respective transformed block representing the corresponding portion of the image in a second domain;
  a filter configured to generate in response to each transformed block a respective filtered block;
  an inverse-transformer configured to transform each filtered block into a respective inverse-transformed block representing the corresponding portion of the image in the first domain; and
  a resolution converter configured
    to convert at least one of the inverse-transformed blocks into a respective converted block representing the corresponding portion of the image at a second resolution, and to provide each converted block to the transformer.

15. The system of claim 14 wherein the image-capture device, transformer, filter, inverse transformer, and resolution converter are disposed on a same integrated circuit.

16. The system of claim 14 wherein the image-capture device, transformer, filter, inverse transformer, and resolution converter are disposed on at least two different integrated circuits.

17. A method, comprising:
receiving input blocks each representing a portion of an image in a first domain and at a first resolution;
generating in response to each input block a respective transformed block representing the corresponding portion of the image in a second domain;
generating in response to each transformed block a respective filtered block;
transforming each filtered block into a respective inverse-transformed block representing the corresponding portion of the image in the first domain;
converting at least one inverse-transformed block into a respective converted block representing the corresponding portion of the image at a second resolution; and
generating from each converted block a respective input block.

18. The method of claim 17 wherein generating a respective filter block includes generating in response to each filter block multiple filter blocks according to respective filter algorithms.

19. The method of claim 17 wherein converting at least one inverse-transformed block includes down-sampling the at least one inverse-transformed block into a respective converted block representing the corresponding portion of the image at a second resolution that is lower than the first resolution.

20. The method of claim 17, further comprising:
generating initial ones of the input blocks in response to the respective portions of the image; and
wherein generating a respective input block includes generating from each converted block a respective subsequent input block.

21. The method of claim 17, further comprising:
identifying a keypoint of the image in response to at least one of the inverse-transformed blocks; and
generating in response to the identified keypoint a descriptor corresponding to the keypoint.

22. The method of claim 17 wherein at least two of the input blocks represent overlapping portions of the image.

23. The method of claim 17 wherein at least two of the inverse-transformed blocks represent overlapping portions of the image.

24. A non-transitory computer-readable medium storing instructions that, when executed by a computing apparatus, cause the computing apparatus, or another apparatus under the control of the computing apparatus:
to receive input blocks each representing a portion of an image in a first domain and at a first resolution;
to generate in response to each input block a respective transformed block representing the corresponding portion of the image in a second domain;
to generate in response to each transformed block a respective filtered block;
to transform each filtered block into a respective inverse-transformed block representing the corresponding portion of the image in the first domain;
to convert at least one inverse-transformed block into a respective converted block representing the corresponding portion of the image at a second resolution; and
to generate from each converted block a respective input block.

* * * * *